United States Patent [19]

Maki

[11] Patent Number: 4,621,852

[45] Date of Patent: Nov. 11, 1986

[54] INCHING APPARATUS FOR ROBOT HANDS

[76] Inventor: Syuichi Maki, Chiyo-machi Yamate Onoda-shi Yamaguchi-ken, Japan

[21] Appl. No.: 690,986

[22] Filed: Jan. 14, 1985

[30] Foreign Application Priority Data

Jan. 30, 1984 [JP] Japan .................................. 59-13394

[51] Int. Cl.⁴ .............................................. B66C 1/48
[52] U.S. Cl. .................................. 294/86.4; 294/67.22; 294/81.62
[58] Field of Search .................... 294/86.4, 81.2, 67.33, 294/93, 115, 106, 81.54, 81.62, 67.22, 116, 901, 902; 414/120, 117, 118, 736, 751

[56] References Cited

U.S. PATENT DOCUMENTS 3,909,056 9/1975 Duwe ............................... 294/67.22
4,360,110 11/1982 Sigman et al. ................... 294/81.62

Primary Examiner—James B. Marbert
Attorney, Agent, or Firm—Stevens, Davis, Miller & Mosher

[57] ABSTRACT

An inching apparatus for robot hands in which a travelling member with a pair of scrapers are threadedly engaged with a threaded rod rotated by a rotational shaft of a rotary actuator mounted on the robot so that said travelling members may be moved forward and back.

2 Claims, 4 Drawing Figures

INCHING APPARATUS FOR ROBOT HANDS

BACKGROUND OF THE INVENTION

In the past, when a box-shape article is held by an L-shape finger and a pair of scrapers in the robot, the article is under the condition that it is pressed by the pair of scrapers. Where the article is fallen down on a predetermined place, if normally the finger is rotated outwardly, the article can be fallen down. However, the article being pressed by the scrapers is slightly deformed, and the article is partly engaged by the scrapers due to the change in weight of the article, the bulge in form because of overpacking of contents, the excessively large dimensions at the outset when manufacturing articles, unevenness of form and the like. Therefore, only the rotation of the finger outwardly makes impossible or extremely difficult to fall the article from the scrapers whereby the function as the hands of the robot cannot always be placed sufficiently. On the other hand, even if the article with a part thereof engaged by the scrapers should be fallen down by its own weight, it is difficult for a fallen article to be fallen accurately at a predetermined position, particularly on articles closedly gathered and stacked in longitudinal and lateral directions, as a consequence of which they are likely inclined and fallen, come into contact with the stacked articles to disturb orderly arranged condition, and in extreme cases, articles under the stacked condition are likely fallen down on the floor or ground, or damaged due to the falling down, which leads to one of causes impairing efficient loading work by utilization of the robot hands.

SUMMARY OF THE INVENTION

The present invention provides an inching apparatus for robot hands in which a threaded rod is rotated by rotation of a rotational shaft loosedly fitted with and extended through a rotary actuator mounted on a part of the robot, and a travelling member with a pair of opposed scrapers threadedly engaged with said threaded rod may be slightly moved away from each other to positively disengage and fall-down a box-shape article from the scrapers.

An object of the present invention is to prevent a box-shape article from being non-disengaged from the robot hands to always fall-down the article on a predetermined place accurately.

A further object of the invention is to rotate through a predetermined angle a rotational shaft extended through a rotary actuator mounted on the robot to positively move through a predetermined distance a pair of scrapers by the rotation of a threaded rod resulting from the rotation of the rotational shaft.

Another object of the present invention is to render possible to easily change a spacing between a pair of scrapers even if dimensions of an article is considerably changed.

DETAILED DESCRIPTION OF THE INVENTION

Construction

Figure 1:
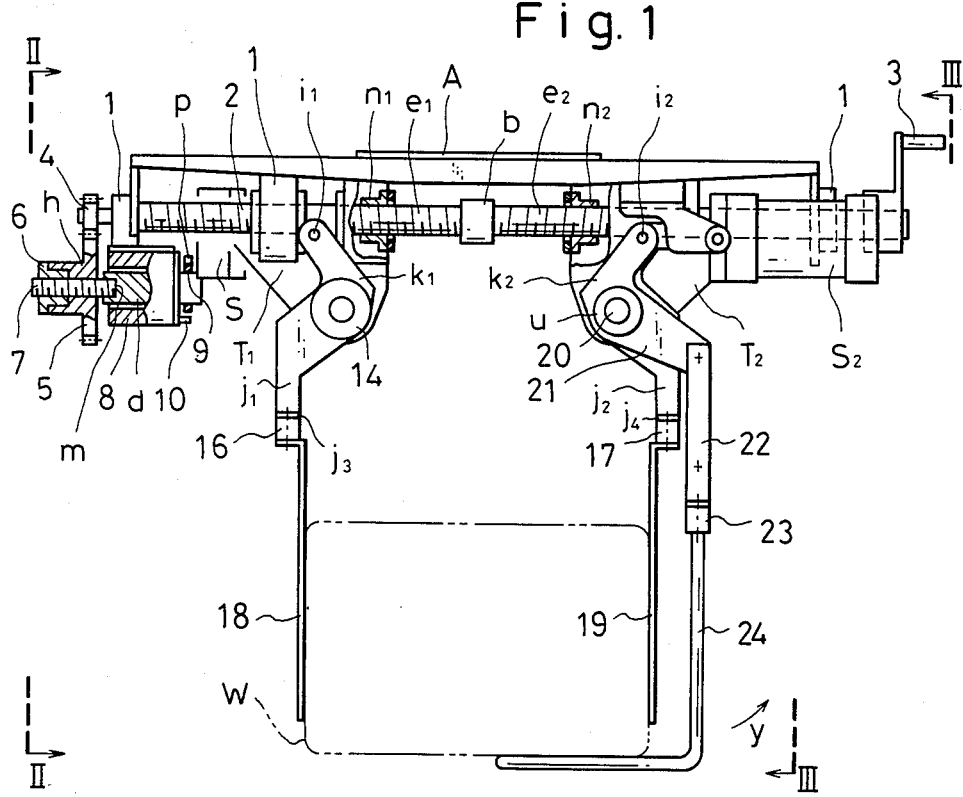
FIG. 1 is a sectional view showing essential portions in which one embodiment in accordance with the present invention is partly cut.

Bearings 1, 1 and 1 are fixed to left and right ends (in FIG. 1) and a middle portion of a support body A mounted on a part of a robot not shown, a partitioning piece b is secured to an approximately central portion of a threaded rod 2 rotatably supported on and extended through these bearings 1, 1 and 1, and external threads $e_1$, $e_2$ of the same pitch are formed opposedly each other right and left with said partitioning piece b as a border. A handle 3 is mounted on the right end of the threaded rod 2, and a large diameter gear 5 is threadedly engaged with a small diameter gear 4 keyed to the left end of the threaded rod 2. A bush 6 is detachably fitted into a hub h of the gear 5, a fastening bolt 7 is threadedly engaged with and fastened to internal threads formed in inner peripheral surfaces of these hub h and bush 6, and an extreme end m thereof is screwed into one end of a rotational shaft d loosely fitted into and extended through a rotary actuator 8 rotatably suspended and supported on the support body A by suitable means, the extreme end m of the fastening bolt 7 being disengaged from the rotational shaft d to render the gear 5 rotatable. A rotating piece 9 is mounted in the vicinity of an end of the rotational shaft d projected from the rotary actuator 8 on the side opposite the gear 5, and a projection p of the rotating piece 9 is made movably to and from a stopping piece 10 secured to the rotary actuator 8. The stopping piece 10 is adjustable in setting position through an adjusting hole c bored in a member such as a cover in the rotary actuator 8 on the side of the rotating piece 9. Rotation of the projection p of the rotating piece 9 till it comes into contact with the stopping piece 10 slightly rotates the threaded rod 2 through the rotational shaft d, and the gears 5, 4 to slightly move the setting position of scrapers 18, 19.

Figure 2:
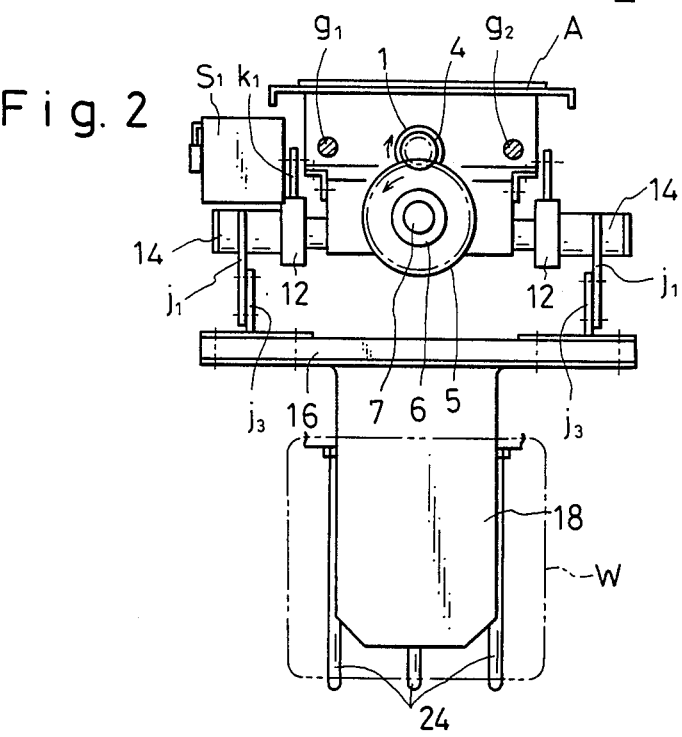
FIG. 2 is a perspective view taken on line II—II of FIG. 1.
Figure 3:
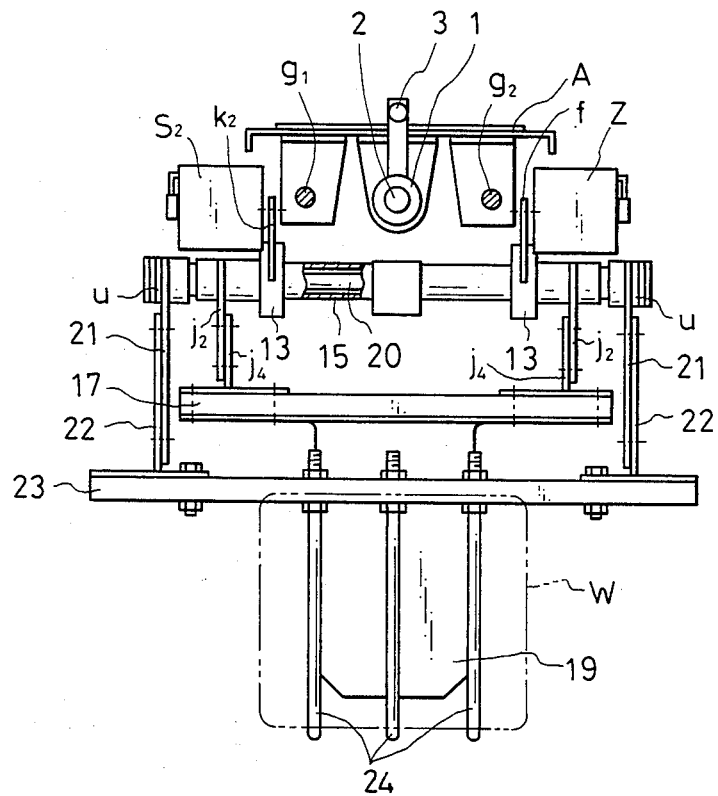
FIG. 3 is a sectional view partly cut along III—III of FIG. 1.

Scaraper turning cylinders $S_1$, $S_2$ are mounted on one ends of a pair of opposed travelling members $T_1$, $T_2$ respectively having nuts $n_1$, $n_2$ suitably threadedly engaged with right and left portions of the partitioning piece b of the threaded rod 2, and connecting pieces $k_1$, $k_2$ are movably connected through pins $i_1$, $i_2$ to ends of piston rods (not shown) mounted movably forward and back on these scraper turning cylinders $S_1$, $S_2$, said connecting pieces $k_1$, $k_2$ having lower ends connected integrally with shaft cylinders 14, 15 rotatably extended and supported on bearings 12, 13. The scrapers 18, 19 are secured to and suspended through swinging bodies $j_1$, $j_2$, connecting bodies $d_3$, $d_4$ and lateral members 16, 17 which are respectively integrally suspended from these shaft cylinders 14, 15. A finger turning cylinder z opposite the scraper turning cylinder $S_2$ is mounted on a travelling body $T_2$ about the threaded rod 2. A connecting piece f is movably connected through a pin to the end of a piston rod (not shown) mounted movably forward and back on the finger turning cylinder z. A middle portion of a rotational shaft 20 loosely fitted internally of the shaft cylinder 15 is integrally connected to the lower end of the connecting piece f. A lateral member 23 is horizontally and laterally secured through connect-bodies 22, 22 to swinging bodies 21, 21 formed at upper ends thereof with bulged bodies u, u respectively fitted and secured to both ends of the rotational shaft 20. A suitable number (three in this embodiment) of fingers 24 are secured to and suspended in parallel from the lateral member 23, and when the fingers 24 are rotated in the direction of arrow y (in FIG. 1), an article W is made possible to be fallen down. It will be noted that means for separately rotating the scrapers 18, 19 and fingers 24 comprises no object and gist of the present invention, and therefore, the detailed explanation thereof is omitted. Travelling bodies $T_1$, $T_2$ are loosely fitted to guide rods $g_1$, $g_2$ mounted along the front and rear portions (see FIGS. 2 and 3) of the threaded rod 2 in the suitable place of the support body A to impede useless swinging and inclination during travelling.

Operation

Figure 4:
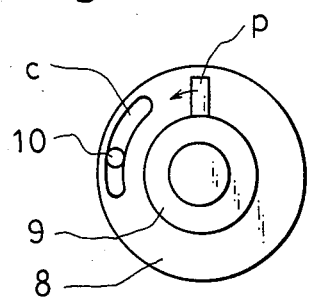
FIG. 4 is a view showing the state of arrangement of a rotating piece and a stopping piece.

Next, operation of the present invention will be described. When a box-shape article W, wherein right and left portions thereof are held under pressing conditions by a pair of opposed scrapers 18, 19 and the lower end thereof is supported by the fingers 24, is transported to the desired place for disengagement and falling-down, if the finger 24 is turned in the direction of arrow y in FIG. 1 by operation of the finger turning cylinder z, the article W loses its lower support and falls down between the scrapers 18 and 19 by its own weight. However, when the article W held under the pressing condition by the scrapers 18, 19 is partly buldged and deformed, partly projected due to the overpacking of contents received in the article W and has its dimension and form more inflated than normal ones at the outset of manufacturing articles, and when the bulged portion of the article W is engaged with a pat of the scrapers 18, 19 even if the finger 24 fails to support the lower end of the article W or the article does not fall down because the article itself is inclined, an operator (not shown) rotates the projection p of the rotating piece 9 counterclock in FIG. 4 until it comes into contact with the stopping piece 10, then the threaded rod 2 is rotated clockwise through engagement between the gears 5 and 4 via the rotational shaft integrally connected to the rotating piece 9 and with the rotation of the threaded rod 2, the nuts $n_1$, $n_2$ in engagement therewith is forcibly slightly moved right and left from the position as indicated by the solid lines of FIG. 1 whereby the travelling bodies $T_1$, $T_2$ respectively provided with the nuts $n_1$, $n_2$ are slightly moved in a direction where they move away from each other along the threaded rod 2. Therefore, the scrapers 18, 19 suspended from the travelling bodies $T_1$, $T_2$ are also moved away from each other to form a small clearance with respect to the article W so that the article W easily falls disengages and falls down from the scrapers 18, 19. In adjusting the inching distance of the scrapers 18, 19 by the article W, if the setting position of the stopping piece 10 is adjusted through an adjusting hole c, the rotating angle till the the projection p of the rotating piece 9 comes into contact with the stopping piece 10 may be adjusted. Where the dimension of the article W is considerably changed, the fastening bolt 7 is once untightened to disengage the end m thereof from the rotational shaft d to free the rotational direction of the gear 5, after which the handle 3 is operated to travel and set the travelling bodies $T_1$, $T_2$ themselves to the desired position along the threaded rod 2 through the nuts $n_1$, $n_2$ and then fasten the fastening bolt 7 at the position shown in FIG. 1. In disengaging the end m of the fastening bolt 7 from the hub h, the bush 6 may be easily separated from the gear 5.

Characteristics

A pair of opposed travelling bodies movably forward and back in a direction opposite each other are threadedly fitted to the threaded rod rotatably supported on the support body, the gear meshed with the gear mounted on one end of the threaded rod is fastened to or untightened from the rotational shaft loosely fitted to the rotary actuator, and the rotating angle of the rotating piece connected to the rotational shaft. Therefore, in falling down of the article held by the scrapers, when the article is not disengaged from the scrapers due to the deformation of article, the excess of regular dimensions or the partial projection, the rotating piece may be slightly rotated to slightly move the pair of the travelling bodies along the threaded rod through the rotation of the gears and threaded rod to thereby slightly spread the spacing between the scrapers, thus easily falling down the article. Therefore, the rotating piece may be rotated to fall down the article perpendicularly without taking consideration of the state of an article held under the pressing condition by the scrapers, and thus, already orderly arranged articles are not turned unreasonably due to the falling down of the article, no possible breakage or damage occurs due to the falling down of inclined mode of the article itself or unexpected troubles with respect to vessels, passersby and the like are not induced. Therefore, safety loading work may be carried out. Since the rotational angle of the rotating piece may be rotated, the dimension of the article may be changed merely by changing the setting position of the travelling bodies to the threaded rod. In addition, In greatly changing the dimension of the article itself, the gear is set free with respect to the rotational shaft and thereafter the threaded rod is continuously rotated to considerably travel the travelling bodies speedily and easily to the desired position of the threaded rod. With this, loading work of various box-shape articles which are different in dimension are possible to make and handling is also simple.

What is claimed is:

1. An inching apparatus for robot hands comprising a rotary actuator mounted on the robot, a rotational shaft loosely fitted and extended through said rotary actuator, a fastening bolt into which an extreme end portion of the rotational shaft is detachably fitted, a bush threadedly engaged with the fastening bolt, a gear into which said bush is detachably fitted and having a hub threadedly engaged with said fastening bolt, a threaded rod having a gear meshed with the first-mentioned gear secured to one end thereof, a handle mounted on the other end of the threaded rod, a partitioning piece secured approximately in the central portion of said threaded rod, and travelling bodies with scrapers, respectively, which travel in the direction opposite each other on both sides of the partitioning piece.

2. An inching apparatus for robot hands comprising a rotary actuator mounted on the robot, a rotational shaft loosely fitted and extended through said rotary actuator, a rotating piece with a projection secured to one side of the rotational shaft and facing to the outside of the rotary actuator, a stopping piece movable to and from said projection and adjustable in setting position, a fastening bolt having an extreme end portion detachably fitted into the rotational shaft on the side opposite said rotating piece, a bush threadedly engaged with the fastening bolt, a gear into which said bush is detachably fitted and threadedly engaged with said fastening bolt, a threaded rod having a gear meshed with said first-mentioned gear to one end thereof, a partitioning piece secured approximately in the central portion of the threaded rod, and travelling bodies with scrapers incorporating nuts threadedly engaged with threads, respectively, formed in both sides of said partitioning piece in the opposite direction and with the same pitch.

* * * * *